US007164866B2

(12) United States Patent
Endo

(10) Patent No.: US 7,164,866 B2
(45) Date of Patent: Jan. 16, 2007

(54) IMAGE FORMING DEVICE THAT WRITES LOG DATA TO STORAGE MEDIUM

(75) Inventor: Yoshinori Endo, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 221 days.

(21) Appl. No.: 10/913,757

(22) Filed: Aug. 9, 2004

(65) Prior Publication Data

US 2005/0036793 A1 Feb. 17, 2005

(30) Foreign Application Priority Data

Aug. 11, 2003 (JP) .......................... P2003-291264

(51) Int. Cl.
*G03G 15/00* (2006.01)
*G06F 3/12* (2006.01)

(52) U.S. Cl. ............................ 399/1; 399/10; 399/12; 399/110

(58) Field of Classification Search ................. 399/12, 399/9, 10, 1, 107, 110; 358/1.13, 1.15, 1.16
See application file for complete search history.

(56) References Cited

U.S. PATENT DOCUMENTS 5,260,742 A * 11/1993 Kikkawa .................. 399/1 X
5,608,494 A * 3/1997 Ogura et al. ................ 399/366
2002/0122671 A1* 9/2002 Yoshimura .................. 399/12

FOREIGN PATENT DOCUMENTS

| | | |
|---|---|---|
| JP | A 2001-69260 | 3/2001 |
| JP | A 2002-41270 | 2/2002 |
| JP | A 2002-86814 | 3/2002 |
| JP | A 2002-314907 | 10/2002 |
| WO | WO 00/78082 A 1 | 12/2000 |

* cited by examiner

*Primary Examiner*—Sophia S. Chen
(74) *Attorney, Agent, or Firm*—Oliff & Berridge, PLC

(57) ABSTRACT

A storage area of a removable storage medium is divided into a header and a plurality of log data writing areas. Each log data writing area records log data for printers having the same model name. The header is further divided into a plurality of header data storage areas, each area storing a single model name and the top address of a log data writing area indicating the destination for recording log data of devices having this model name. In this way, an association is established between the model name and the log data.

20 Claims, 5 Drawing Sheets

IMAGE FORMING DEVICE THAT WRITES LOG DATA TO STORAGE MEDIUM

BACKGROUND OF THE INVENTION

1. Field of the Invention

The present invention relates to an image-forming device that writes log data to a removable storage medium.

2. Description of the Related Art

Image-forming devices, such as printers or facsimile machines, capable of writing log data to a storage medium are well known in the art. These image-forming devices enable the user to manage the image-forming device based on the stored log data.

For example, an image-forming device (facsimile server) disclosed in Japanese unexamined patent application publication No. 2002-41270 stores log data and the like on CompactFlash (registered trademark) memory cards, serving as a removable storage medium.

With this construction, the removable storage medium can be removed from the image-forming device and read using a personal computer or another external device, enabling the user to view log data for the image-forming device stored on the removable storage medium. This makes managing the image-forming device easier than when the log data is stored in a storage medium built into the image-forming device.

However, when managing a plurality of image-forming devices, the user may become confused as to which image-forming device pertains to the log data stored on a removable storage medium after the removable storage medium has been removed from the image-forming device. It may be particularly difficult to determine which image-forming device pertains to log data stored on a removable storage medium, when the removable storage medium has been used on a certain image-forming device and is subsequently used on a different image-forming device. Faced with this confusion, the user may be unable to manage an image-forming device appropriately based on the log data stored in the removable storage medium.

SUMMARY OF THE INVENTION

In view of the foregoing, it is an object of the present invention to overcome the above problems and also to enable reliable management of a plurality of image-forming devices based on log data stored on a removable storage medium, even when the removable storage medium is used for a plurality of image-forming devices.

In order to attain the above and other objects, according to one aspect of the present invention, there is provided an image forming device including a mounting unit that mounts a removable storage medium and a controller that writes data to the removable storage medium mounted in the mounting unit. The controller writes log data for the image-forming device to the removable storage medium in association with specifying data for specifying the image-forming device.

According to another aspect of the present invention, there is provided an image forming device including mounting means for mounting a removable storage medium and writing means for writing data to the removable storage medium mounted in the mounting means. The writing means writes log data for the image-forming device to the removable storage medium in association with specifying data for specifying the image-forming device.

DESCRIPTION OF THE PREFERRED EMBODIMENT

Figure 1:
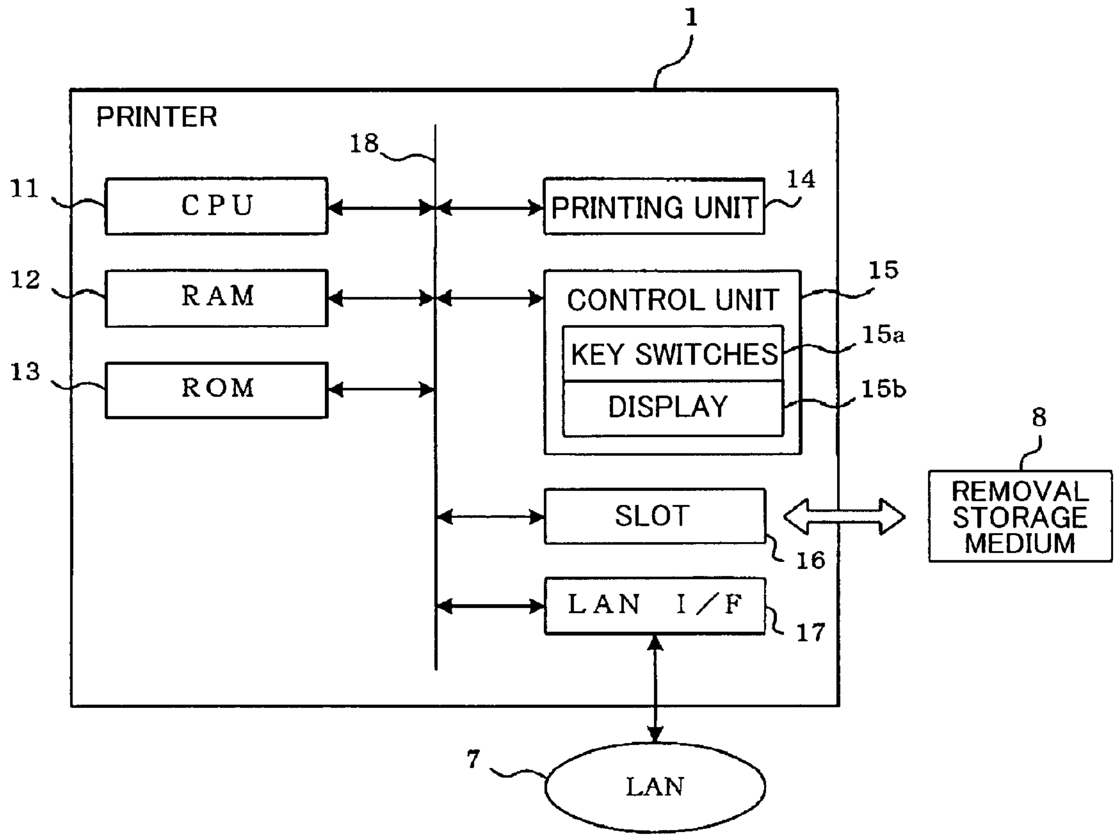
FIG. 1 is a block diagram showing the general construction of a printer serving as an image forming device according to an embodiment of the present invention.

Next, an image-forming device according to a preferred embodiment of the present invention will be described while referring to the accompanying drawings. FIG. 1 is a block diagram showing the general construction of a printer 1, serving as the image-forming device according to the preferred embodiment of the present invention.

As shown in FIG. 1, the printer 1 includes a central processing unit (CPU) 11, a random access memory (RAM) 12, a read only memory (ROM) 13, a printing unit 14, a control unit 15, a slot 16, and a local area network (LAN) interface 17, all of which are connected and capable of communicating each other via a bus 18.

The CPU 11 controls overall operations of the printer 1. The RAM 12 provides a work area for the CPU 11, a storage area for storing various data, and the like. The ROM 13 stores programs that are executed by the CPU 11, as well as settings and other data. The printing unit 14 performs operations to print images on paper. The control unit 15 includes a group of key switches **15*a*, such as alphanumeric keys for facilitating user input, and a display (LCD) 15*b* for displaying the status of operations, providing operational guidance, and the like. The slot 16 has a connector (not shown) for connecting to a removable storage medium 8 (CompactFlash (registered trademark) in the present embodiment). The removable storage medium 8 is a non-volatile external memory for storing data that can be overwritten. The slot 16 has a read/write function for reading data from and writing data to the removable storage medium 8 connected to the connector. The LAN interface 17 performs communications via a LAN 7**.

The printer 1 includes a function for writing log data pertaining to the printer 1 to the removable storage medium 8 mounted in the slot 16. Hereinafter, this function will be referred to as a "log data writing function."

The removable storage medium 8 can also be removably inserted in a slot provided in a personal computer (not shown) that is formed according to the same standard as the slot 16, enabling log data stored on the removable storage medium 8 to be referenced on the personal computer. Preferably the removable storage medium 8 can be inserted into or removed from the slot in the printer 1 or the personal computer while the power to the printer 1 or the personal computer is ON so as to facilitate mounting and removal of the removal storage medium 8. It is also preferable that the slots be configured for easy access by exposing the slots on the outsides of the printer 1 and the personal computer or providing a cover over each slot so that the slot is exposed when the cover is opened.

Here, log data written to the removable storage medium 8 can be broadly classified as log data written in a format for updating log data that was previously written to the removable storage medium 8 (hereinafter refer to as "cumulative log data"), and log data written in a format for appending new data without changing log data previously written to the removable storage medium 8 (hereinafter refer to as "appending log data").

The cumulative log data is historical data representing integrated values from the start of management. The cumulative log data includes values accumulated from the start of managing the printer 1, such as an accumulated number of printed pages for each type of paper or an accumulated number of printed pixel numbers. By recording the cumulative log data, it is possible to perform statistical management according to long-term use.

Appending log data is broadly categorized as log data written for each print job (hereinafter refer to as "job log data"), and log data written when an error occurs (hereinafter refer to as "error log data").

Job log data is historical data describing the details of a print job. The job log data includes the job name, user name, date, and number of printed pages, for example. By recording the job log data, it is possible to perform management related to the content of print jobs.

Error log data is historical data describing details of errors that have occurred. The error log data includes content that was displayed on the LCD 15*b* and the page counter value when an error occurred, for example. By recording error log data, it is possible to manage the frequency in which errors occur and the causes for such errors.

The appending log data also includes a serial number that is unique to the appending log data.

Next, the storage area of the removable storage medium 8 will be described.

Figure 2:
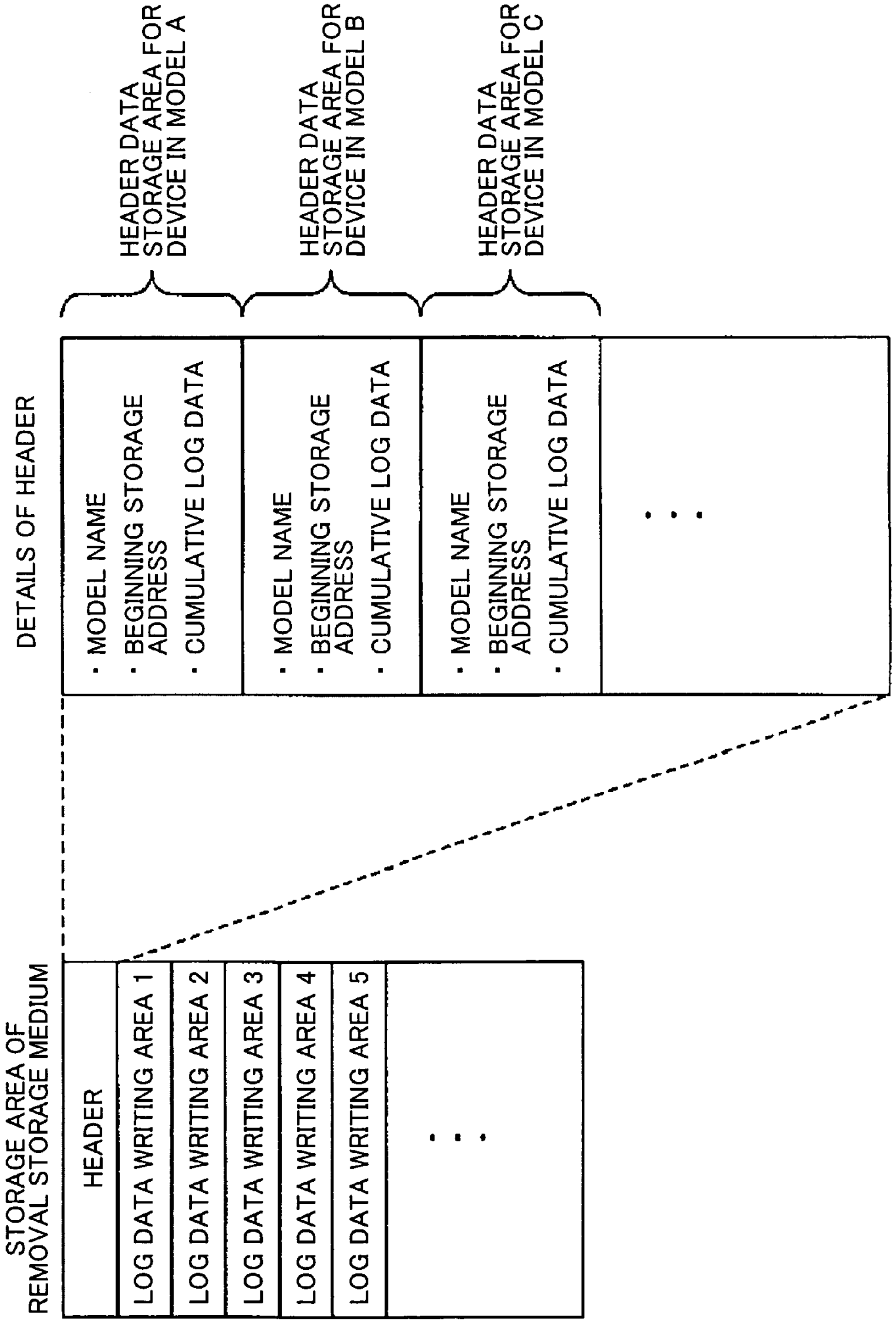
FIG. 2 is an explanatory view of a storage area of a removal storage medium according to the embodiment of the present invention.

As shown in FIG. 2, the storage area of the removable storage medium 8 in this embodiment is divided into a header and a plurality of log data writing areas. The log data writing areas are regions in which appending log data is written. Each log data writing area is used as an area for writing appending log data for any printer 1 having the same model name. For example, when using a removable storage medium 8 that is shared among a plurality of printers having a log data writing function identical to the printer 1, appending log data for a printer having a different model name is written to a different log data writing area, while appending log data for printers having the same model name are written to the same log data writing area even when the data is for a different printer. In other words, the appending log data is sorted by model name and recorded in the log data writing area corresponding to the model name. As a result, users of the printer 1 can easily manage log data for each model name when managing a plurality of printers having log data writing functions other than the printer 1 (including printers with different model names from the printer 1).

As shown in FIG. 2, the header in the storage area of the removable storage medium 8 is divided into a plurality of header data storage areas. Each of the header data storage areas stores a single model name, the top address of a log data writing area storing appending log data for a printer having this model name (hereinafter refer to as "beginning storage address"), and cumulative log data for the printer having this model name. The model name is recorded at the top of the header data storage area.

By storing a model name in association with a beginning storage address in the header in this manner, a correlation is formed between the model name and the log data writing area expressed by the beginning storage address, thereby associating the model name with the appending log data recorded in this log data writing area. In other words, it is possible to determine what model name of printer the appending log data pertains to by the log data writing area in which the appending log data is stored. Accordingly, it is possible to determine what appending log data pertains to what model name of printer when using an external device, such as a personal computer, to reference data recorded in the removable storage medium 8.

In this embodiment, each log data writing area has the same size, and a value representing the size of the log data writing area is pre-stored on each printer having a log data writing function. Accordingly, the range of the log data writing area can be expressed by writing the beginning storage address.

Figure 3:
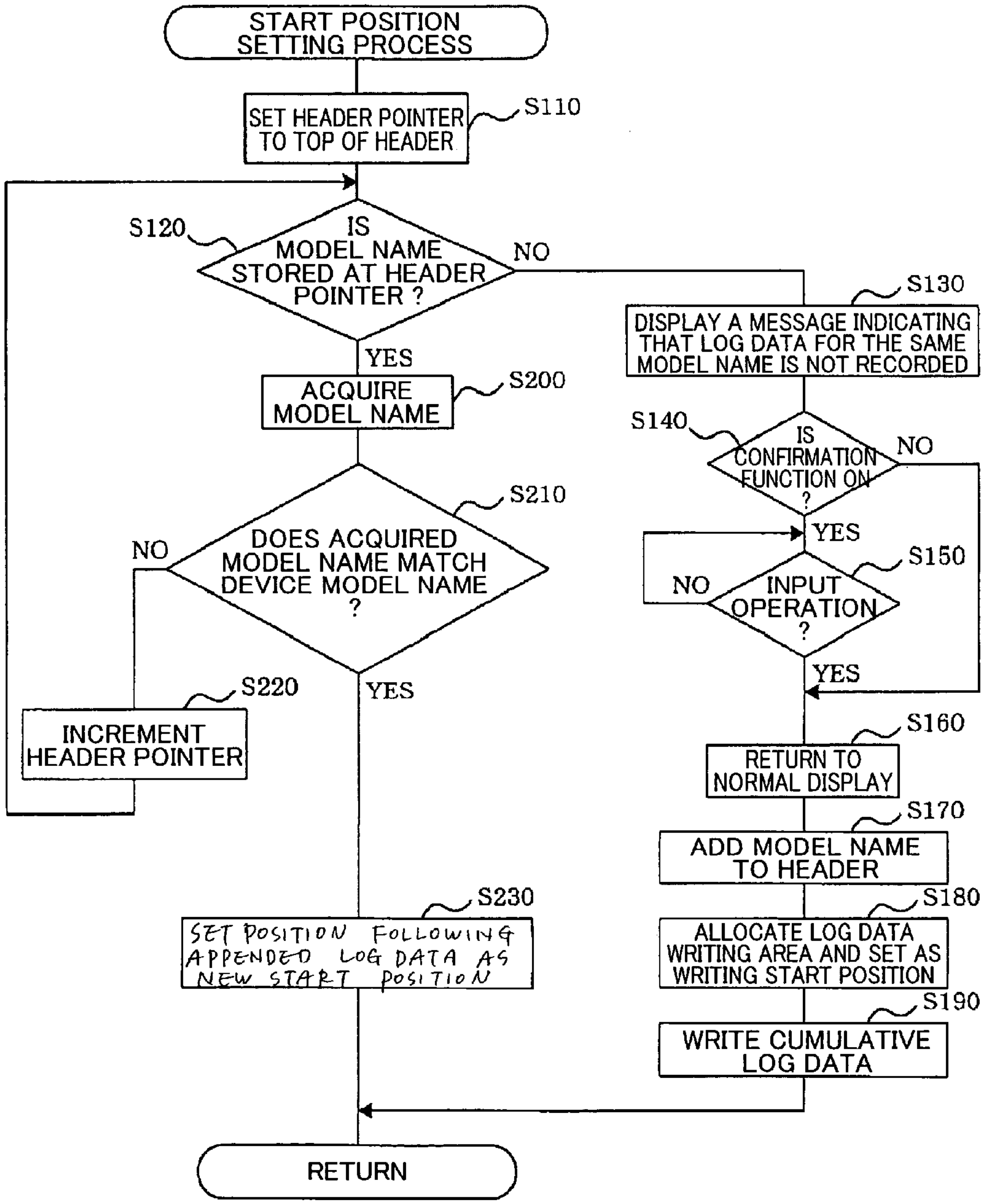
FIG. 3 is a flowchart representing a start position setting process according to the embodiment of the present invention.

Next, a start position setting process executed by the CPU 11 for setting a start position in the removable storage medium 8 to begin writing appending log data will be described with reference to FIG. 3. The start position setting process begins when the power to the printer 1 is turned ON while the removable storage medium 8 is mounted in the slot 16, or when the removable storage medium 8 is inserted into the slot 16 while the power to the printer 1 is ON.

At the beginning of the start position setting process in S110, a header pointer (data reference position in the header) is set to the top of the header. In S120, the CPU 11 determines whether a model name is recorded at the position indicated by the header pointer.

If the CPU 11 determines in S120 that a model name has not been recorded at the position indicated by the header pointer (S120:NO), then in S130, the CPU 11 displays a message on the LCD 15*b* indicating that log data for a printer having the same model name as the printer 1 is not recorded on the removable storage medium 8.

In S140 the CPU 11 determines whether a confirmation function is set to ON. The confirmation function is a function possessed by the printer 1 for confirming whether the user wishes to continue using the removable storage medium 8 mounted in the slot 16 of the printer 1 when the removable storage medium 8 does not contain log data for a printer having the same model name as the printer 1. The confirmation function informs the user when the user has mistakenly inserted a removable storage medium 8 that is different from the removable storage medium 8 normally used on the printer 1, for example.

Figure 4:
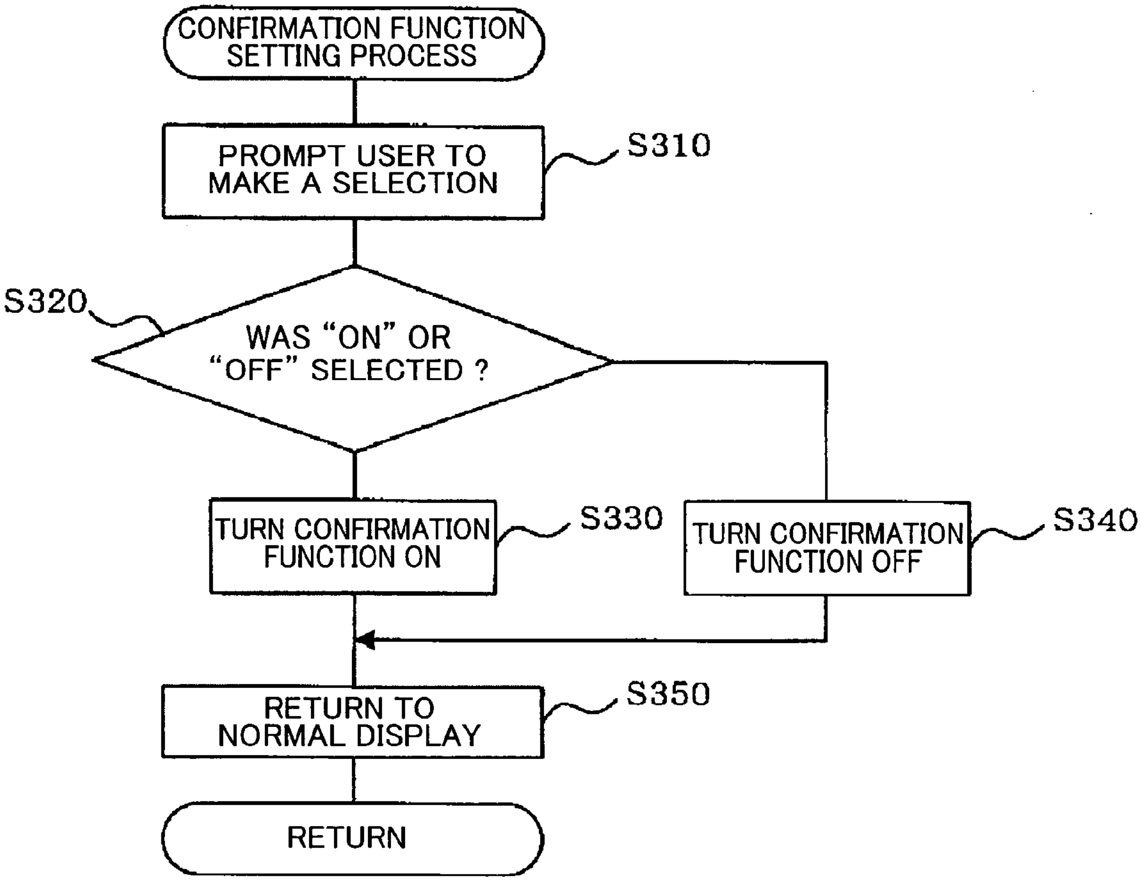
FIG. 4 is a flowchart representing a confirmation function setting process according to the embodiment of the present invention.

A confirmation function setting process executed by the CPU 11 for setting the confirmation function ON or OFF will be described briefly with reference to the flowchart of FIG. 4. The confirmation function setting process is performed to establish whether or not to execute the confirmation function. The confirmation function setting process begins when the user performs input operations using the key switches 15*a* of the control unit 15, indicating a desire to view a menu for setting the confirmation function ON or OFF.

At the beginning of this process in S310, the CPU 11 displays a message on the LCD 15*b* prompting the user to perform an input operation for setting the confirmation function ON or OFF.

In S320, the CPU 11 determines whether "ON" or "OFF" was selected for the confirmation function through an input operation on the control unit 15. If the CPU 11 determines in S320 that "ON" was selected through an input operation, then in S330, the CPU 11 turns the confirmation function ON (stores data indicating that the setting status for the confirmation function is ON).

However, if the CPU 11 determines in S320 that "OFF" was selected for the confirmation function through an input operation, then S340, the CPU 11 turns the confirmation function OFF (stores data indicating that the setting status of the confirmation function is OFF).

In S350, the CPU 11 returns the LCD 15*b* to a normal display and ends the confirmation function setting process.

Thus, in S140 of the start position setting process (FIG. 3), the CPU 11 determines whether the confirmation function set in the process described above is currently ON.

If the CPU 11 determines in S140 that the confirmation function has been turned ON (S140:YES), then in S150, the CPU 11 determines whether the user has performed a specific input operation on the key switches 15*a* indicating a desire to use the current removable storage medium 8 mounted in the slot 16. A message prompting the user to perform the specific input operation may also be displayed on the LCD 15*b* of the control unit 15.

In S150, the CPU 11 loops in a wait state until the specific input operation has been performed. Upon determining that the specific input operation has been performed (S150: YES), the CPU 11 advances to S160. It should be noted that in this wait state, operations for writing log data to the removable storage medium 8 are prohibited, as well as image printing operations performed by the printing unit 14. Also, the start position setting process ends when the removable storage medium 8 is removed from the slot 16. Accordingly, the user may indicate an intention of not using the removable storage medium 8 inserted in the slot 16 by removing the removable storage medium 8.

If the CPU 11 determines in S140 that the confirmation function has not been turned ON (S140:NO), then the CPU 11 advances directly to S160. In S160, the CPU 11 returns the LCD 15*b* to a normal display.

In S170, the CPU 11 performs a process to write the model name of the printer 1 in the header. Specifically, the CPU 11 writes the model name of the relevant printer 1 in the header data storage area at the top of the header when a header data storage area containing the model name does not exist in the header. However, if header data storage areas containing model names for some device already exist in the header, then the CPU 11 writes the model name of the printer 1 in the topmost header data storage area that is not being used. Hence, header data storage areas are used in order from the top of the header.

In S180, the CPU 11 allocates a log data writing area for writing appending log data for a printer having the model name written in S170. Specifically, the CPU 11 writes the top address of a log data writing area to be allocated in the header data storage area as the beginning storage address. Hence, the start position for writing appending log data is set to the top address in the allocated log data writing area.

In S190, the CPU 11 writes cumulative log data to the header data storage area and ends the start position setting process.

On the other hand, if the CPU 11 determines in S120 that a model name has been recorded at the position indicated by the header pointer (S120:YES), then in S200 the CPU 11 extracts the recorded model name.

In S210, the CPU 11 determines whether the model name extracted in S200 matches the model name of the printer 1. If the CPU 11 determines that the model names do not match in S210 (S210:NO), then in S220, the CPU 11 increments the header pointer to the top address of the next header data storage area and returns to S120. Therefore, if a model name identical to that of the printer 1 is not recorded in any header data storage areas in the header, the CPU 11 performs the processes of S130–S190 described above. In this embodiment, the header data storage areas in the header all have the same size, and the value indicating the size of these header data storage areas is pre-stored on each printer that has a log data writing function. With this configuration, it is possible to perform the process of S220 to increment the header pointer to the top address of the next header data storage area.

However, if the CPU 11 determines in S210 that the model names match (S210:YES), then in S230, the CPU 11 references the beginning storage address recorded in the header data storage area that corresponds to the model name, searches for the end of data (appending log data) stored in the log data writing area indicated by this beginning storage address, and sets the start position for writing appending log data to the position following the end of the data. This process is needed for setting the beginning storage address when the power to the printer 1 is turned ON or when a removable storage medium 8 is mounted to the printer 1. Subsequently, the CPU 11 ends the start position setting process.

Figure 5:
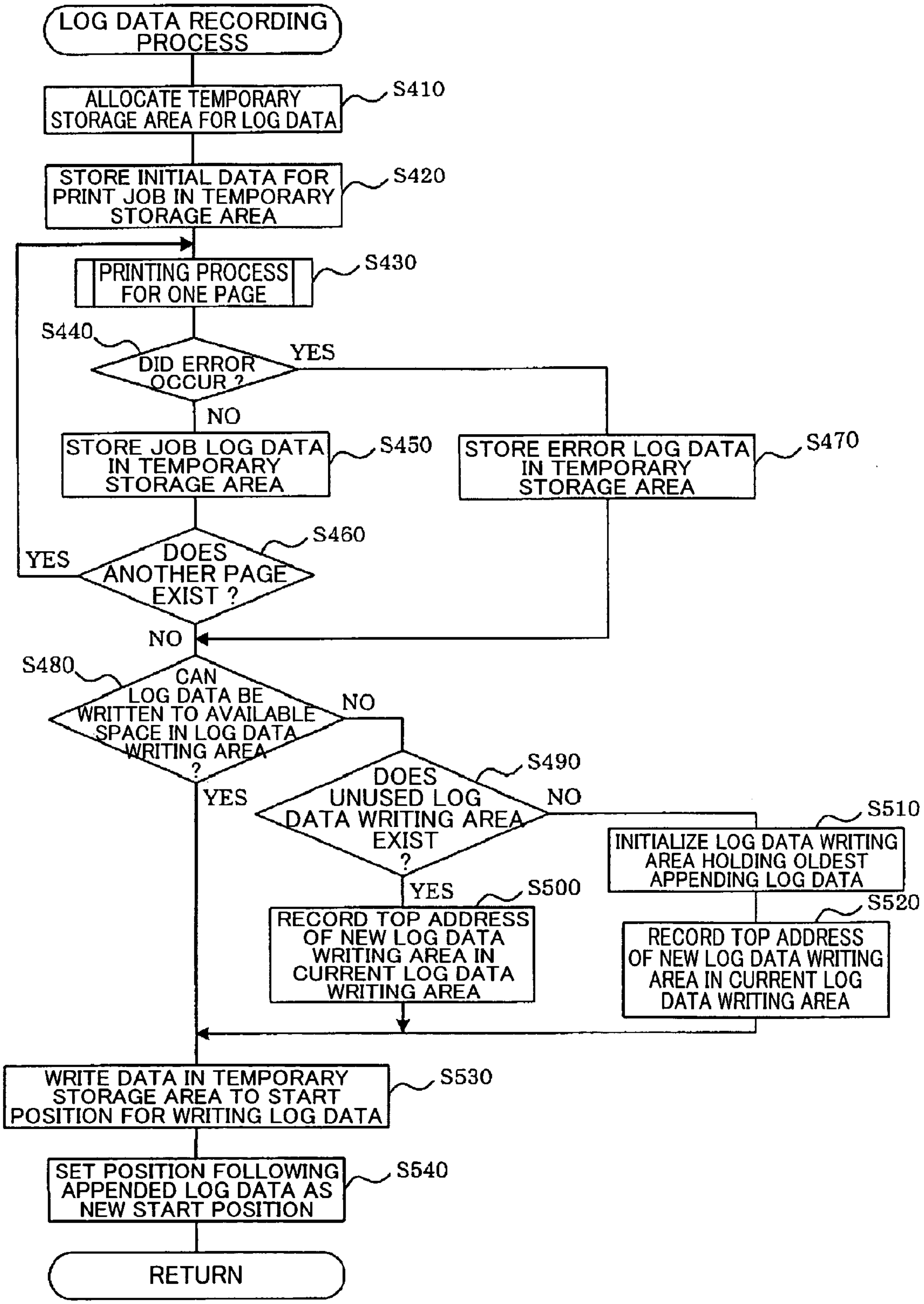
FIG. 5 is a flowchart representing a log data recording process according to the embodiment of the present invention.

Next, a log data recording process executed by the CPU 11 for recording log data will be described with reference to the flowchart of FIG. 5. The log data recording process begins when the CPU 11 receives a command to start an image printing operation, such as a print command from a personal computer or a command to perform a test print inputted through operations on the key switches 15*a* of the printer 1.

At the beginning of the log data recording process in S410, the CPU 11 allocates a temporary storage area for log data in the RAM 12 for temporarily storing appending log data that is to be written to the removable storage medium 8.

In S420, the CPU 11 stores initial data for the print job in the temporary storage area allocated in S410. In this embodiment, one initial data entry exists for each print job in the job log data. Appropriate initial data may be a job name, user name, or the like.

In S430, the CPU 11 performs a printing process for controlling the printing unit 14 to print one page worth of images. In S440, the CPU 11 determines whether an error occurred.

If the CPU 11 determines in S440 that an error has not occurred (S440:NO), then in S450, the CPU 11 stores job log data for the page printed in S430 in the temporary storage area.

In S460, the CPU 11 determines whether another page of data exists. If another page of data exists (S460:YES), then the CPU 11 returns to S430 and repeats the process for the next page of data.

However, if another page does not exist in S460 (S460: NO), the CPU 11 advances to S480. If the CPU 11 determines in S440 that an error has occurred (S440:YES), then in S470, the CPU 11 stores error log data in the temporary storage area and advances to S480.

In S480 the CPU 11 determines whether or not data stored in the temporary storage area can be written in the available space remaining in the log data writing area, which is provided for recording appending log data for the printer 1. In other words, the CPU 11 determines whether the log data writing area has sufficient available space for writing the data stored in the temporary storage area.

If the CPU 11 determines in S480 that the data stored in the temporary storage area cannot be written to the available space in the log data writing area (S480:NO), then in S490, the CPU 11 determines whether an unused log data writing area in which no appending log data has been recorded exists in the storage area of the removable storage medium 8.

If the CPU 11 determines in S490 that an unused log data writing area does exist (S490:YES), then in S500, the CPU 11 records the top address of the new log data writing area in the current log data writing area and sets the start position for writing appending log data to this address. By recording the top address of the new log data writing area in the current log data writing area in this way, the appending log data is recorded continuously from the current log data writing area to the new log data writing area. Accordingly, a plurality of log data writing areas can be used in a linked formation as the size of the appending log data increases. Subsequently, the CPU 11 advances to S530.

However, if the CPU 11 determines in S490 that an unused log data writing area does not exist (S490:NO), then in S510, the CPU 11 allocates a new log data writing area by initializing the log data writing area in which the oldest appending log data was recorded. To do this, a process is performed for initializing the data recorded in the header data storage area corresponding to this log data writing area. The log data writing area having the oldest appending log data can easily be determined by establishing an order for allocating log data writing areas in advance, for example.

In S520, as in the process of S500 described above, the CPU 11 records the top address of the new log data writing area allocated in S510 in the current log data writing area, and sets the start position for writing appending log data to this address. Subsequently, the CPU 11 advances to S530.

If the CPU 11 determines in S480 that the data stored in the temporary storage area can be written to the available space in the log data writing area (S480:YES), then the CPU 11 advances directly to S530.

In S530, the CPU 11 writes the appending log data stored in the temporary storage area to the start position for writing appending log data. Also, the CPU 11 performs a process to update the cumulative log data stored in the header.

In S540, the CPU 11 sets the start position for writing appending log data to the position following the end of the appending log data written in S530. Unlike the process in S230, this process in S540 is needed for setting the start position (beginning storage address) when new log data was written to the removal storage medium 8. Subsequently the log data recording process ends.

As described above, the printer 1 according to the present embodiment records log data in the removable storage medium 8 in association with the model name. Hence, it is possible to determine which log data pertains to which model name of printer when log data for a plurality of printers has been recorded in a single removable storage medium 8, enabling the user to manage a plurality of printers reliably. Further, since the log data is sorted by model name when recorded, a plurality of printers can be conveniently managed according to the model name. Further, the removable storage medium 8 requires a smaller storage capacity than when log data is sorted and recorded according to individual printers.

In this embodiment, associations between the model names and log data are made based on the areas in which log data is recorded. Since the same model name need not be recorded more than once, unlike in the conventional method that records the model name for each log data, the printer 1 according to the present embodiment can more effectively use the storage area in the removable storage medium 8. Moreover, a plurality of log data can easily be associated with a single model name.

The printer 1 allocates a log data writing area corresponding to the model name when necessary. Accordingly, the printer 1 can use the storage area of the removable storage medium 8 more effectively than when log data writing areas corresponding to each model name are pre-allocated in the storage area of the removable storage medium 8. Further, by writing the beginning storage address in the header, one printer can determine the range of the log data writing area allocated by another printer.

If it is not possible to write all of the appending log data in the log data writing area, the printer 1 can allocate a new log data writing area. Accordingly, the printer 1 can effectively use the storage capacity of the removable storage medium 8 without setting the log data writing areas to an unnecessarily large size.

Further, the printer 1 has a confirmation function for prompting the user to confirm whether to use the removable storage medium 8 currently mounted in the printer 1 if the removable storage medium 8 does not contain log data for a printer having the same model name as the printer 1. Accordingly, the printer 1 can notify the user when the user has mistakenly inserted a storage medium different from the removable storage medium 8 that is normally used. Further, since the printer 1 remains in a wait state until the user indicates an intention, the printer 1 can prevent unnecessary log data writing areas from being allocated in the removable storage medium 8 and can prevent operations for printing images despite an inability to write log data. In addition, since the user can select whether to turn the confirmation function ON or OFF (that is, the user selection in S140 determines whether the prohibitive step in S150 is executed), an appropriate process can be performed according to the intended use.

While some exemplary embodiments of this invention have been described in detail, those skilled in the art will recognize that there are many possible modifications and variations which may be made in these exemplary embodiments while yet retaining many of the novel features and advantages of the invention.

For example, according to the embodiment described above, the printer 1 sorts and writes log data to the removable storage medium 8 for each model name, which is one type of data for specifying a printer. However, log data may be sorted according to one of the following three types of specifying data.

(1) Log data may be sorted according to unique data assigned to each printer (a serial number or the like). In this way, log data can be managed for each printer.

(2) Log data may be sorted according to the version of log data. Here, version refers to the format of the log data. In other words, the log data is sorted according to printers having the same number and type of items in the log data. Hence, log data can be more easily read by storing log data having the same format in the same storage area.

(3) The log data may also be sorted into groups specified by the user. For example, if the user divides a plurality of printers into three groups for management, the log data is sorted according to these three groups. With this configuration, log data can be recorded according to the user's management conditions.

Further, while the printer 1 according to the embodiment described above records job log data and error log data in a common log data writing area, the present invention is not limited to this configuration. For example, a log data writing area for job log data may be provided separately from a log data writing area for error log data.

In the printer 1 according to the embodiment described above, a new log data writing area is allocated when the appending log data cannot be written in the available space of the current log data writing area. Similarly, a new header area may be allocated in an unused portion of the removable storage medium 8 when the current header area becomes full.

Further, CompactFlash is used as the removable storage medium 8 for writing log data in the printer 1 according to the embodiment described above. However, another removable storage medium, such as SmartMedia (registered trademark), Memory Stick (registered trademark), and PC cards may be used.

In the embodiment described above, the storage area of the removable storage medium 8 is divided into a plurality of regions. Alternatively, a folder may be created for each model name using a common file system, such as that provided in Windows (registered trademark) or the like.

In the embodiment described above, the removable storage medium 8 is a rewritable (erasable) storage medium, but a recordable (write-once) storage medium may also be used. However, the rewritable storage medium described in the embodiment is desirable for the ability to update cumulative log data.

Further, the content of the log data written to the removable storage medium is not limited to the content given in the embodiment described above. For example, the log data may include some of the content given in the embodiment or may include only content not described in the embodiment.

Further, in addition to a printer, the present invention may be applied to a facsimile machine, copy machine, or another image-forming device.

As described above, each printer having a log data writing function in the above-described embodiment pre-stores the value expressing the size of the log data writing area, but the present invention is not limited to this configuration. For example, by storing the value expressing the size of the log data writing area in the removable storage medium 8, it is no longer necessary to store this value on each printer. Moreover, the size of the log data storing area can be different according to the removable storage medium 8. Further, it is not necessary that each log data writing area be the same size. In this case, the range of each log data writing area may be specified by a top address and an end address, for example.

What is claimed is:

1. An image-forming device, comprising:

a mounting unit that mounts a removable storage medium; and a controller that writes data to the removable storage medium mounted in the mounting unit;

wherein the controller writes log data for the image-forming device to the removable storage medium in association with specifying data for specifying the image-forming device, and the log data is comprised of at least one of cumulative log data and appending log data.

2. The image-forming device according to claim 1, wherein the controller writes a plurality of log data to the removable storage medium in association with a single set of specifying data.

3. The image-forming device according to claim 2, wherein the controller determines whether or not specifying data of the image-forming device has been written to the removable storage medium mounted in the mounting unit, and writes log data for the image-forming device in association with the specifying data when determining that the specifying data has been written to the removable storage medium.

4. The image-forming device according to claim 2, wherein the controller writes log data for the image-forming device to a writing area allocated in a storage area of the removable storage medium that corresponds to specifying data for the image-forming device.

5. The image-forming device according to claim 4, wherein the controller determines whether or not specifying data of the image-forming device has been written to the removable storage medium mounted in the mounting unit, and allocates a writing area corresponding to the specifying data in the storage area of the removable storage medium when determining that the specifying data has not been written to the removable storage medium.

6. The image-forming device according to claim 5, wherein the controller allocates the writing area by writing data indicating the range of the writing area in the storage area of the removable storage medium to the removable storage medium.

7. The image-forming device according to claim 4, wherein when log data for the image-forming device cannot be completely written to the writing area corresponding to the specifying data of the image-forming device, the controller allocates a new writing area corresponding to the specifying data in the storage area of the removable storage medium.

8. The image-forming device according to claim 1, further comprising a notifying unit, wherein the controller determines whether or not specifying data for the image-forming device has been written to the removable storage medium mounted in the mounting unit, and controls the notifying unit to notify a user that the specifying data has not been written when determining that the specifying data has not been written.

9. The image-forming device according to claim 8, further comprising an input unit on which the user performs inputting operations, wherein the controller refrains from writing the log data until a prescribed input operation has been performed on the input unit when the controller controls the notifying unit to notify the user that the specifying data has not been written.

10. The image-forming device according to claim 9, further comprising an image-forming unit that is controlled by the controller to perform an image-forming operation, wherein the controller also refrains from controlling the image-forming unit to perform the image-forming operation when refraining from writing the log data.

11. An image-forming devices comprising:

mounting means for mounting a removable storage medium; and writing means for writing data to the removable storage medium mounted in the mounting means;

wherein the writing means writes log data for the image-forming device to the removable storage medium in association with specifying data for specifying the image-forming device, and the log data is composed of at least one of cumulative log data and appending log data.

12. The image-forming device according to claim 11, wherein the writing means writes a plurality of log data to the removable storage medium in association with a single set of specifying data.

13. The image-forming device according to claim 12, wherein the writing means determines whether or not specifying data of the image-forming device has been written to the removable storage medium mounted in the mounting means, and writes log data for the image-forming device in association with the specifying data when determining that specifying data has been written to the removable storage medium.

14. The image-forming device according to claim 12, wherein the writing means writes log data for the image-forming device to a writing area allocated in a storage area of the removable storage medium that corresponds to specifying data for the image-forming device.

15. The image-forming device according claim 14, wherein the writing means determines whether or not specifying data of the image-forming device has been written to the removable storage medium mounted in the mounting means, and allocates a writing area corresponding to the specifying data in the storage area of the removable storage medium when determining that the specifying data has not been written to the removable storage medium.

16. The image-forming device according to claim 15, wherein the writing means allocates the writing area by writing data indicating the range of the writing area in the storage area of the removable storage medium to the removable storage medium.

17. The image-forming device according to claim 14, wherein when log data for the image-forming device cannot be completely written to the writing area corresponding to the specifying data of the image-forming device, the writing means allocates a new writing area corresponding to the specifying data in the storage area of the removable storage medium.

18. The image-forming device according to claim 11, further comprising notifying means for determining whether or not specifying data for the image-forming device has been written to the removable storage medium mounted in the mounting means, and performing a notification operation when determining that the specifying data has not been written.

19. The image-forming device according to claim 18, further comprising input detecting means for detecting input operations and prohibiting means for prohibiting operations of the writing means until a prescribed input operation has been detected by the input detecting means when the notifying means performs the notification operation.

20. The image-forming device according to claim 19, further comprising image-forming means for performing an image-forming operation, wherein the prohibiting means also prohibits operations by the image-forming means when prohibiting the operations of the writing means.

* * * * *